(12) United States Patent
Bastide et al.

(10) Patent No.: US 12,266,053 B2
(45) Date of Patent: Apr. 1, 2025

(54) DECLUTTERED VIEWS IN A VIRTUAL ENVIRONMENT

(71) Applicant: International Business Machines Corporation, Armonk, NY (US)

(72) Inventors: Paul R. Bastide, Ashland, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 18/168,752

(22) Filed: Feb. 14, 2023

(65) Prior Publication Data

US 2024/0273817 A1     Aug. 15, 2024

(51) Int. Cl.
  *G06T 17/00*   (2006.01)
  *G06F 16/901*  (2019.01)
  *H04N 13/351*  (2018.01)

(52) U.S. Cl.
  CPC .......... *G06T 17/00* (2013.01); *G06F 16/9024* (2019.01); *H04N 13/351* (2018.05)

(58) Field of Classification Search
  None
  See application file for complete search history.

(56) References Cited

U.S. PATENT DOCUMENTS

| | | | |
|---|---|---|---|
| 8,441,475 B2 | 5/2013 | Hamilton, II et al. | |
| 9,338,200 B2 | 5/2016 | Park et al. | |
| 10,424,101 B2 | 9/2019 | Castelli et al. | |
| 11,235,530 B2 | 2/2022 | Kaltenbach et al. | |
| 2007/0063999 A1 | 3/2007 | Park | |
| 2010/0156909 A1 | 6/2010 | Banerjee et al. | |
| 2013/0222369 A1* | 8/2013 | Huston | G06F 16/954 345/419 |
| 2013/0238803 A1 | 9/2013 | Bhogal et al. | |
| 2013/0311361 A1 | 11/2013 | Boss et al. | |
| 2016/0253842 A1* | 9/2016 | Shapira | G06T 19/006 345/633 |
| 2017/0032551 A1* | 2/2017 | Fried | G06T 7/11 |
| 2018/0107839 A1 | 4/2018 | Clement et al. | |

(Continued)

FOREIGN PATENT DOCUMENTS

EP    3983969 A1    4/2022

OTHER PUBLICATIONS

Ratan, et al, "The metaverse is money and crypto is king—why you'll be on a blockchain when you're virtual-world hopping", https://theconversation.com/the-metaverse-is-money-and-crypto-is-king-why-youll-be-on-a-blockchain-when-youre-virtual-world-hopping-171659, (Retrieved: Feb. 7, 2023), 5 pages.

*Primary Examiner* — Edward Martello
(74) *Attorney, Agent, or Firm* — CANTOR COLBURN LLP; Joseph Curcuru

(57) ABSTRACT

Embodiments of the invention provide a computer system that includes a processor electronically coupled to a memory. The processor is operable to perform processor operations that include determining that a user is in a virtual reality (VR) environment and accessing a multisensory state associated with the VR environment and the user. A multisensory declutter analysis is applied to the multisensory state to generate decluttered multisensory streams. The decluttered multisensory streams are used to generate a decluttered multisensory view associated with the user.

20 Claims, 16 Drawing Sheets

(56) References Cited

U.S. PATENT DOCUMENTS

| | | | |
|---|---|---|---|
| 2018/0309803 A1 | 10/2018 | Bastide et al. | |
| 2018/0309955 A1 | 10/2018 | Lawrence | |
| 2020/0150754 A1 | 5/2020 | Bastide et al. | |
| 2022/0129670 A1* | 4/2022 | Lin | G06V 10/50 |
| 2022/0242450 A1 | 8/2022 | Sokolov et al. | |
| 2023/0118460 A1* | 4/2023 | Liba | G06T 7/155 |
| 2024/0169501 A1* | 5/2024 | Liu | G06T 7/194 |

* cited by examiner

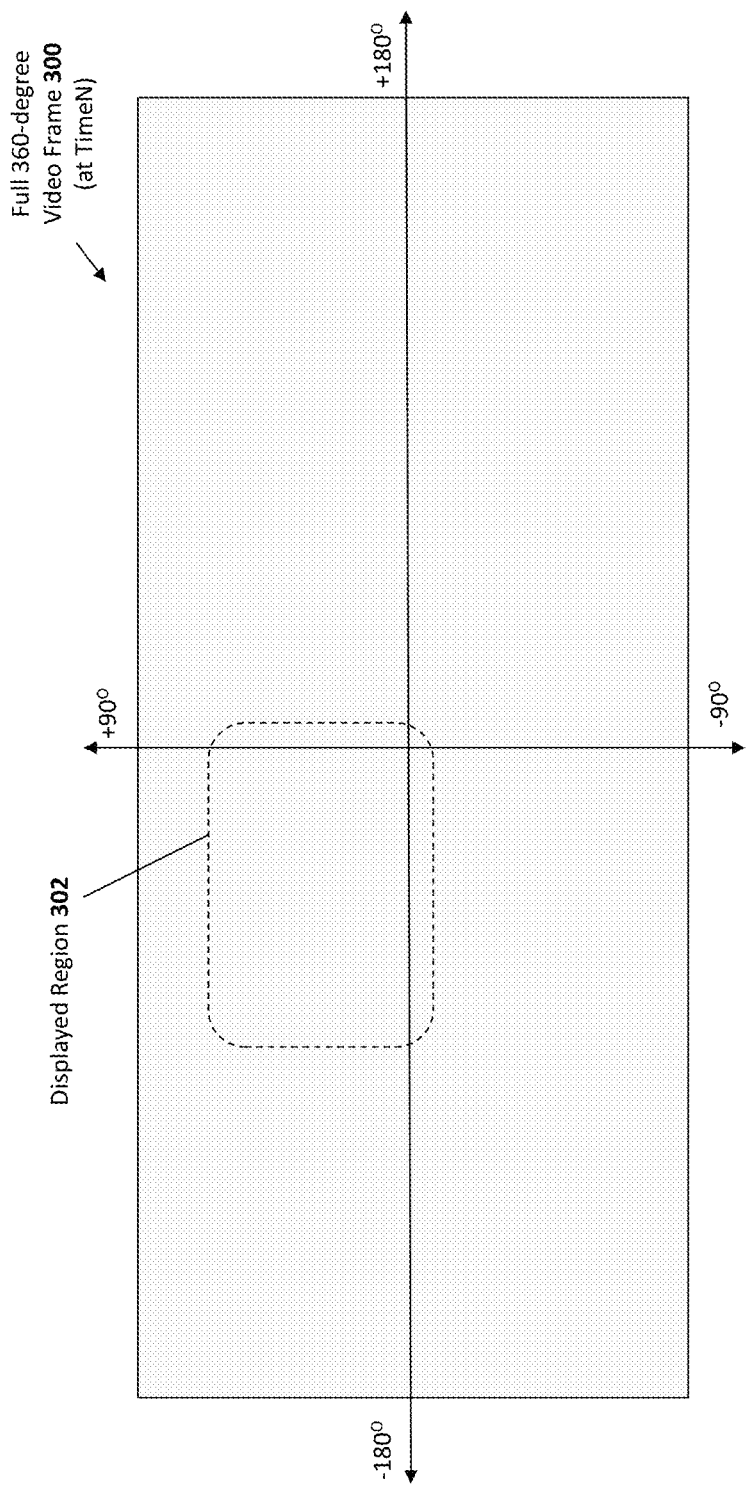

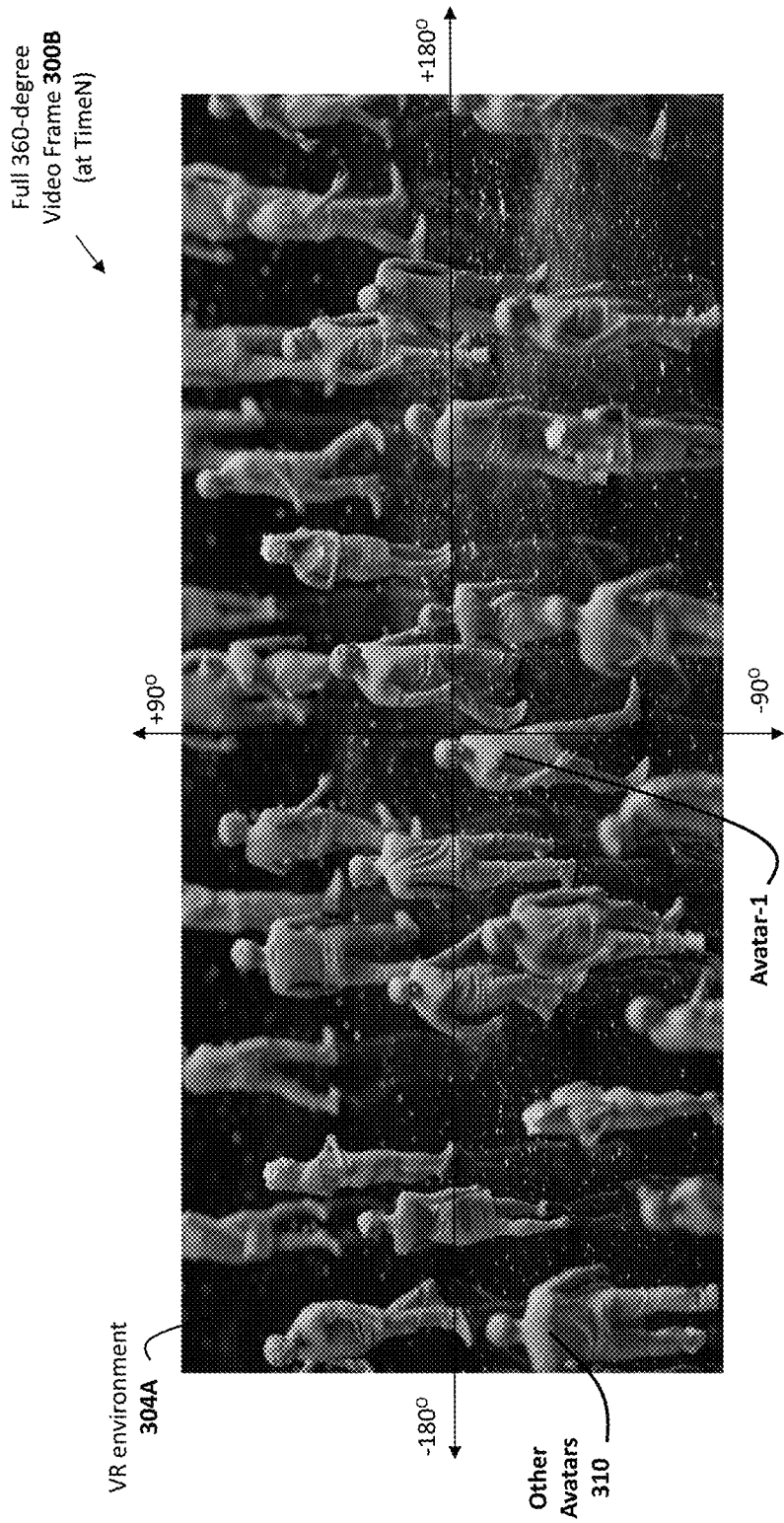

| Input | Audio Stream | Orientation | Multisensory Component Details |
|---|---|---|---|
| 1 | Sound(Vibration) | Down | Multisensory Component-A (z: 4unit, y: 2unit, x: 8unit) Width: 1, Length: 3 // Brown |
| 2 | Silent | Right | Multisensory Component-B (a Person) (Name: Fred) (z: 4unit, y: 2unit, x: 7unit) Width: 1, Length: 4 // Orange |
| 3 | The Food is awesome. You should order from Store-A. | Right-Forward | Multisensory Component-C (a Person) (Name: unknown) (Description: bearded man eating) (z: 2unit, y: 1unit, x: 2unit) Width: 1, Length: 4 // Black and Gray |
| 4 | ... The Food is OK. | Away | Multisensory Component-D (a Person) (Name: unknown) (Description: Culinary Expert) (z: 2unit, y: 1unit, x: 2unit) Width: 1, Length: 4 // Black and Gray |

Graph database table 602

FIG. 6

US 12,266,053 B2

DECLUTTERED VIEWS IN A VIRTUAL ENVIRONMENT

BACKGROUND

The present invention relates in general to programmable computer systems operable to implement virtual reality (VR) environments. More specifically, the present invention relates to computing systems, computer-implemented methods, and computer program products operable to improve user engagement and attentive collaboration by providing a local-user with dynamically-updated, decluttered views in a VR environment.

Immersive videos or spherical videos (e.g., 360-degree videos, 180-degree video, and the like) are video recordings where a view in every direction (or in multiple directions) is recorded at the same time using, for example, an omnidirectional camera or a collection of cameras. An immersive video system can be implemented as a computer system operable to generate and display immersive video images, audio content, haptic feedback, text, and the like that simulate a real world experience. A person can enter and leave the simulated real world experience at any time using technology. The basic components of an immersive video system include a display; a computing system; and various feedback components that provide inputs from the user to the computing system.

The term "metaverse" describes a variety of VR environments, including highly immersive internet-based three-dimensional (3-D) or virtually integrated environments. A metaverse environment can also be described as an online "place" where physical, virtual and augmented realities are shared. In an example implementation, a metaverse can be constructed to host a virtual implementation of a conference-type meeting in which remotely-located conference participants attend the conference virtually by accessing the metaverse implementation of the conference.

SUMMARY

Embodiments of the invention provide a computer system that includes a processor electronically coupled to a memory. The processor is operable to perform processor operations that include determining that a user is in a virtual reality (VR) environment and accessing a multisensory state associated with the VR environment and the user. A multisensory declutter analysis is applied to the multisensory state to generate decluttered multisensory streams. The decluttered multisensory streams are used to generate a decluttered multisensory view associated with the user.

Embodiments of the invention also provide computer-implemented methods and/or computer program products having substantially the same features as the computer system described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 3A depicts a block diagram illustrating additional details of a full 360-degree video frame according to embodiments of the invention;

FIG. 3C depicts a block diagram illustrating additional details of a full 360-degree video frame according to embodiments of the invention;

FIG. 6 depicts a block diagram illustrating an example of how portions of the system shown in FIG. 1 can be implemented according to embodiments of the invention;

Figure 1:
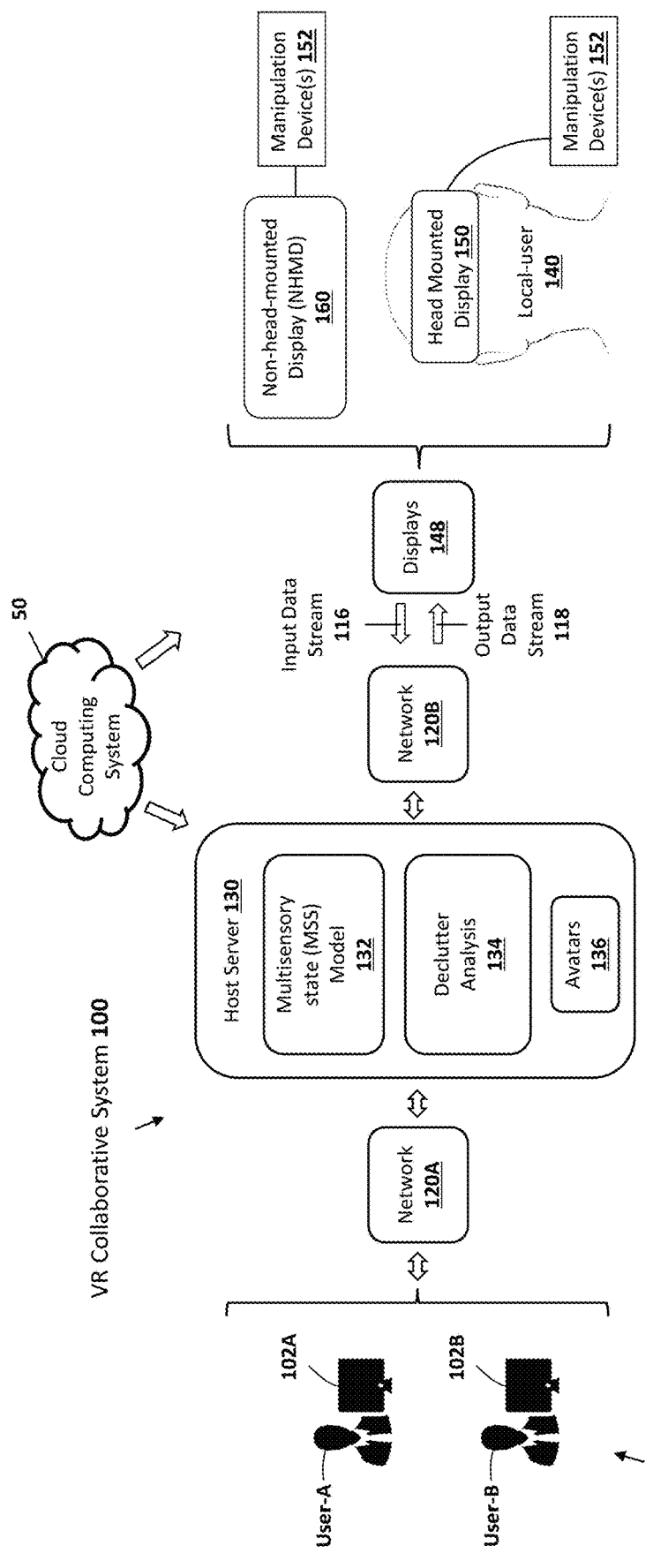
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Turning now to an overview of technologies that are relevant to and/or support aspects of the invention, as previously noted herein, immersive videos, immersive video frames, spherical videos, and/or spherical video frames (e.g., 360-degree video, 180-degree video, and the like) are video recordings where a view in every direction (or in multiple directions) is recorded at the same time using, for example, an omnidirectional camera or a collection of cameras. An immersive video system can be implemented as a computer system operable to generate and/or display immersive video images, audio content, still photos, animations, text content, haptic feedback, and the like that simulate a real world experience. A person can enter and leave the simulated real world experience at any time using technology. The basic components of an immersive video system include a display; a computing system; and various feedback components that provide inputs from the user to the computing system. In some implementations, the display can be integrated within a head-mounted device (HMD) worn by the user and configured to deliver sensory impressions to the human senses (sight, sound, touch, smell, and the like) that mimic the sensory impressions that would be delivered to the human senses by the corresponding actual environment being displayed through the video. The type and the quality of these sensory impressions determine the level of immersion and the feeling of presence in the immersive video system. Other outputs provided by the HMD can include audio output and/or haptic feedback. The user can further interact with the HMD by providing inputs for processing by one or more components of the HMD. For example, the user can provide tactile inputs, voice commands, and other inputs while the HMD is mounted to the user's head.

The term "metaverse" describes a variety of VR environments, including highly immersive internet-based 3-D or virtually integrated environments. A metaverse environment can also be described as an online "place" where physical, virtual and augmented realities are shared. In an example implementation, activities of teams that need to collaborate to perform a task can, in theory, be performed by remotely-located collaborators meeting and performing collaboration activities in a metaverse environment. A metaverse collaboration and/or meeting environment could, if practically implemented as a replacement for a corresponding physical environment, save on power, space utilization, rent, and the ability to retain employees. VR headsets could further enhance the experience of a metaverse collaboration/meeting environment by incorporating 3D graphics (e.g., augmented reality), customizable dashboards, and other elements. The collaborators and/or attendees would not need to be in the same room if they are in the same "virtual space," thus enabling them to collaborate/meet even more effectively. The ability to virtually "travel" to various "places" in the metaverse could enable a collaborator/attendee to virtually visit any number of remote physical locations and interface efficiently with the systems at the remote physical locations.

Despite the potential benefits of performing collaboration/meeting activities in a VR (or metaverse) environment, there are challenges to realizing the above-described benefits of using VR/metaverse environments. For example, similar to a physical collaboration/meeting environment, when attendance for a collaboration/meeting in a VR environment is high, the choices for interaction and collaboration, as well as the many modalities for engagement (e.g., sight, sound, movement, time, smell, sound, and the like), can be overwhelming for a given collaborator/attendee and extremely difficult to navigate in a disciplined and systematic way. Such high attendance collaborations/meeting in VR environment can be described as "cluttered" VR environments. Cluttered VR environments can have a negative impact on user engagement and attentive collaboration for a given collaborator/attendee. Known attention management tools have been developed to assist with filtering data in a simple engagement modality such as identifying and highlighting to a user certain emails that come into the user's inbox based on user instructions (e.g., highlight all emails from a supervisor). These known techniques perform adequately on a single view—e.g., a user's inbox—but are insufficient to filter or otherwise declutter a composite, multi-modal experience such as a cluttered, metaverse-type VR environment.

Turning now to an overview of aspects of the invention, embodiments of the invention provide computing systems, computer-implemented methods, and computer program products operable to improve user engagement and attentive collaboration by providing a local-user with dynamically-updated, decluttered views in a VR environment. Embodiments of the invention will now be illustrated by way of an example. In this example, User-A attends (i.e., virtually joins) a collaboration/meeting in a metaverse-type VR environment. Fifty (50) attendees are in the VR environment that is hosting the collaboration/meeting. The fifty (50) attendees interact at the substantially the same time, thereby creating fifty (50) independent murmurs or streams of multisensory information. In addition to the fifty (50) independent streams, the multi-sensory environment is further cluttered by the background, application, and/or device-specific sounds that aid in setting the VR environment of the collaboration/meeting. The multi-sensory inputs generated from these interactions are overwhelming to User-A and negatively impact User-A's engagement and attentive collaboration.

Continuing with the example, embodiments of the invention declutter the VR environment of User-A by determining a multisensory state associated with the VR environment and User-A. In some embodiments of the invention, the multisensory state associated with the VR environment and User-A can be determined by generating a graph representation (e.g., a graph model) of the VR environment occupied by User-A. In some embodiments of the invention, the graph representation or graph model of the VR environment occupied by User-A is generated using a graph generation tool (e.g., a graph database). In accordance with aspects of the invention, a multisensory declutter analysis is applied to the multisensory state associated with the VR environment and User-A. In some embodiments of the invention, the multi-sensory declutter analysis is applied by filtering or otherwise analyzing the multisensory state associated with the VR environment and User-A based at least in part on a set of preferences and/or interests associated with User-A. In some embodiments of the invention, the filtering and/or analysis of the multisensory state associated with the VR environment and User-A is performed or generated using a graph analysis tool (e.g., a graph database) operable to search, compare, and otherwise analyze a graph representation (e.g., a graph model) of the VR environment occupied by User-A.

In some embodiments of the invention, the operations performed by the above-described graph database can be enhanced using a cognitive computing system. In some embodiments of the invention, the cognitive computing system can be implemented as a computer-based Q&A module operable to generate an answer to natural language questions in support of interrogation operations performed by the graph database. As a non-limiting example, the Q&A module can include all of the features and functionality of IBM® Watson® DeepQA. DeepQA is a Q&A system that can conduct an interrogation on any subject by applying elements of natural language processing, machine learning, information retrieval, hypothesis generation, hypothesis scoring, final ranking, and answer merging to arrive at a conclusion. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM.

A result of the multisensory declutter analysis is the generation and/or identification of the portions of the multisensory state associated with the VR environment and User-A that match or otherwise satisfy the preferences associated with User-A. This result of the above-described filtering processes is referred to herein as a set of "decluttered" and/or "personalized" multisensory streams associated with User-A. In accordance with aspects of the invention, the set of decluttered/personalized multisensory streams is used by the computing systems that create the VR environment to create and display a decluttered/personalized multisensory view to User-A, wherein the portions of the VR environment that are not included in the decluttered/personalized multisensory view are muted (from all senses) or otherwise deemphasized in the view presented to User-A. In some embodiments of the invention, the decluttered/personalized multisensory view is displayed to User-A without interfering with the underlying "virtual structures" of the VR environment. For example, if User-A begins to virtually walk or move to a new location in the VR environment while the decluttered/personalized multisensory view is being displayed to User-A, a table that is not included in the decluttered/personalized multisensory view but is in the path of User-A when User-A begins to walk will still be in User-A's path when User-A begins to walk. In some embodiments of the invention, the VR environment can be configured to bring a table (and other VR structure items) into the decluttered/personalized multisensory view that would impede User-A's path if User-A begins to walk through or otherwise navigate the VR environment.

In embodiments of the invention, the above-described preferences and/or interests of User-A are continually re-evaluated based on local-user state information associated with User-A while User-A is within the VR environment. For example, the local-user state information can include time, movement, subject change, interest drift (video focus versus verbal), profile preferences, direct level-of-interest, inferred level-of-interest, and the like. In some embodiments of the invention, the preferences and/or interests associated with User-A can include an identification (e.g., by User-A) of the levels of attention User-A needs from others collaborators/attendees. In some embodiments of the invention, the interests and viewpoints of other collaborators/attendees (e.g., User-B, User-C, etc.) can be used to enhance the multisensory declutter analysis (e.g., filtering/analysis operations) used to generate the decluttered/personalized multisensory view for User-A. For example, if the system detects that User-A and User-B are independently discussing the same topic, the multisensory declutter analysis can be configured to perform its filtering/analysis operations in a manner that includes these independent discussions in the decluttered/personalized multisensory view generated and displayed for User-A, as well as in a decluttered/personalized multisensory view generated and displayed for User-B.

Accordingly, embodiments of the invention overcome the shortcomings of known attention management technologies by providing computing systems, computer-implemented methods, and computer program products operable to improve user engagement and attentive collaboration by determining a multisensory state associated with a VR environment and a local-user in the VR environment, and by applying a multisensory declutter analysis to the multisensory state to generate dynamically-updated, decluttered/personalized views for the local-user in the VR environment.

Turning now to a more detailed description of the aspects of the invention, FIG. 1 depicts a diagram illustrating a VR collaborative system 100 according to embodiments of the invention. In aspects of the invention, the system 100 is a 3D immersive video system that includes a host server 130 in communication with remote user terminals 102A, 102B and local terminals (or displays) 148 over networks 120A, 120B (e.g., the Internet). In some embodiment of the invention, the system 100 processes and displays immersive videos or spherical videos (e.g., 360-degree videos, 180-degree video, and the like), which are video recordings where a view in every direction (or in multiple directions) is recorded at the same time using, for example, an omnidirectional camera or a collection of cameras. The non-limiting example functionality of the system 100 described herein is described in connection with the use of 3D immersion rendering in the form of 360-degree renderings such as the full 360-degree video frame 300 shown in FIG. 3A. However, embodiments of the invention apply to other forms of immersive video including for example 180-degree video.

Remote users 110, which are depicted in FIG. 1 as User-A and User-B, interface with the system 100 through remote user terminals 102A, 102B; and a local user(s) 140 interfaces with the system 100 using display 148. Although only two remote users 110 are shown any number of the remote users 110 can be provided. In embodiments of the invention, the displays 148 and/or the remote terminals 102A, 102B can be implemented as a head mounted display (HMD) 150 or a non-HMD (NHMD) 160. The NHDM 160 can be a stand-alone flat panel display or a flat panel display integrated with another device such as a smartphone or a laptop. The HMD 150 is configured to be worn by the local user 140 (or the remote users 110). Both the HMD 150 and the NHMD 160 can be in wired or wireless communication with manipulation device(s) 152 (e.g., a three-dimensional mouse, data gloves, etc.) configured to be worn by and/or otherwise controlled/used by the local user 140 (and/or the remote users 110).

Figure 4:
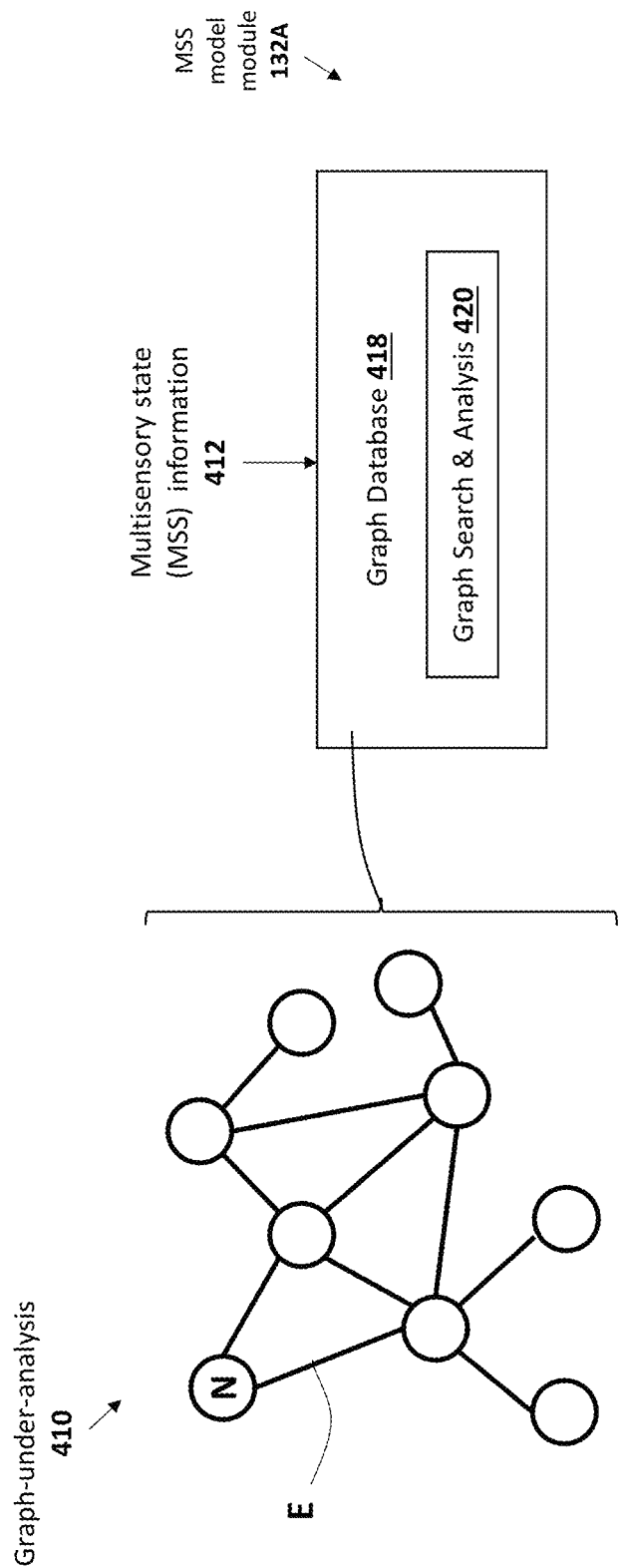
FIG. 4 depicts a block diagram illustrating an example of how portions of the system shown in FIG. 1 can be implemented according to embodiments of the invention.
Figure 5:
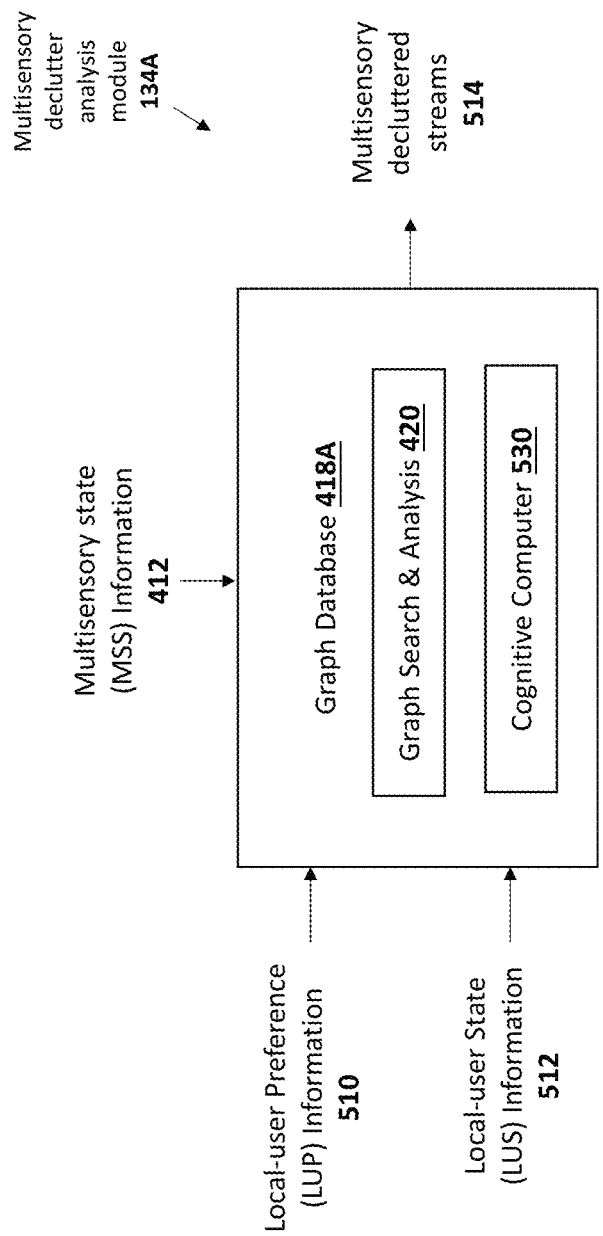
FIG. 5 depicts a non-limiting example of how a multisensory declutter analysis module can be implemented in accordance with aspects of the invention.

The host server 130 is in wired and/or wireless communication with the display(s) 148 and remote user terminals 102A, 102B. In embodiments of the invention, the host server 130 includes a full range of web server and/or web browser functionality (not shown separately from the host server 130). In accordance with aspects of the invention, the host server 130 further includes a multisensory state (MSS) model module 132, a multisensory declutter analysis module 134, and an avatar generation module 136, configured and arranged as shown. In embodiments of the invention, the MSS model module 132 is operable to ingest or otherwise encode the various elements that make up a VR environment (e.g., video frames 300, 300A, 300B, 300C, 300D, 300E, 300F shown in FIGS. 3A-3G) into a graph representation (e.g., a graph model) of the VR environment. In embodiments of the invention, the multisensory declutter analysis module 134 is operable to be applied to the multisensory state generated by the MSS model module 132. In some embodiments of the invention, the multisensory declutter analysis module 134 applies the multisensory declutter analysis by filtering or otherwise analyzing the multisensory state generated by the MSS model module 132 based at least in part on a set of preferences and/or interests associated with User-A. In some embodiments of the invention, the filtering and/or analysis of the multisensory state is performed or generated using a graph analysis tool (e.g., a graph database) operable to search, compare, and otherwise analyze a graph representation (e.g., a graph model) generated by the MSS model module 132. An example of how the MSS model module 132 can be implemented as an MSS model module 132A is depicted in FIG. 4 and described in greater detail subsequently herein. An example of how the multisensory declutter analysis module 134 can be implemented as a multisensory declutter analysis module 134A is depicted in FIG. 5 and described in greater detail subsequently herein.

A cloud computing system 50 is in wired or wireless electronic communication with the system 100, and in particular with the host server 130. The cloud computing system 50 can supplement, support or replace some or all of the functionality (in any combination) of the system 100. Additionally, some or all of the functionality of the system 100 can be implemented as a node of the cloud computing system 50. Additional details of cloud computing functionality that can be used in connection with aspects of the invention are depicted by the computing environment 1000 shown in FIG. 10 and described in greater detail subsequently herein.

Figure 2:
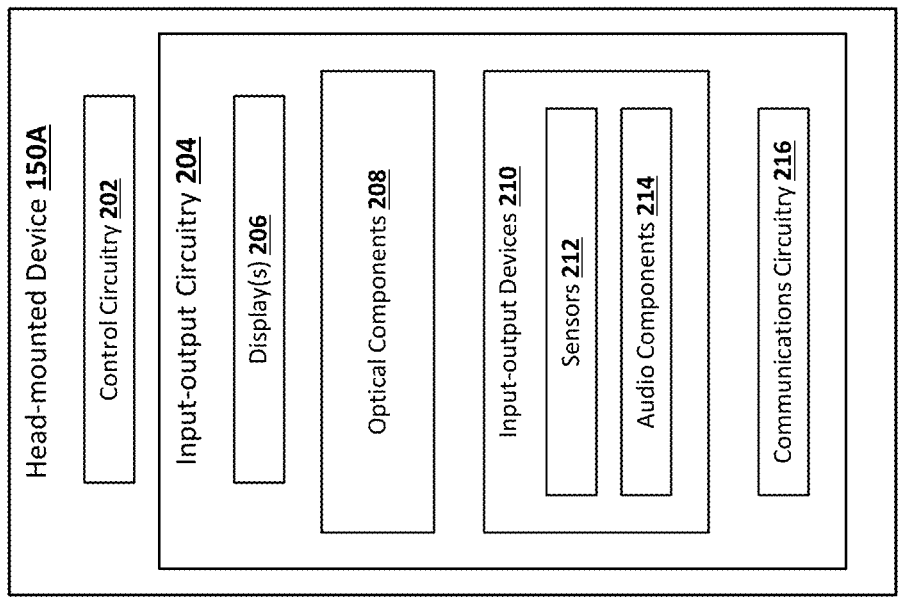
FIG. 2 depicts details of a head-mounted-device (HMD) according to embodiments of the invention.

FIG. 2 depicts an HMD 150A, which is a non-limiting example of how the HMD 150 (shown in FIG. 1) can be implemented. In accordance with aspects of the invention, the HMD 150A includes control circuitry 202 and input-output circuitry 204, configured and arranged as shown. The input-output circuitry 204 includes display(s) 206, optical components 208, input-output devices 210, and communications circuitry 218, configured and arranged as shown. The input-output devices 210 include sensors 212 and audio components 214, configured and arranged as shown. The various components of the HMD 150A can be supported by a head-mountable support structure such as a pair of glasses; a helmet; a pair of goggles; and/or other head-mountable support structure configurations.

In embodiments of the invention, the control circuitry 202 can include storage and processing circuitry for controlling the operation of the HMD 150A. The control circuitry 202 can include storage such as hard disk drive storage, non-volatile memory (e.g., electrically-programmable-read-only memory configured to form a solid-state drive), volatile memory (e.g., static or dynamic random-access-memory), etc. Processing circuitry in the control circuitry 202 can be based on one or more microprocessors, microcontrollers, digital signal processors, baseband processors, power management units, audio chips, graphic processing units, application specific integrated circuits, and other integrated circuits. Computer program instructions can be stored on storage in the control circuitry 202 and run on processing circuitry in the control circuitry 202 to implement operations for HMD 150A (e.g., data gathering operations, operations involving the adjustment of components using control signals, image rendering operations to produce image content to be displayed for a user, etc.).

The input-output circuitry 204 can be used to allow the HMD 150A to receive data from external equipment; a portable device such as a handheld device; a laptop computer; or other electrical equipment) and to allow the user 140 (shown in FIG. 1) to provide the HMD 150A with user input. The input-output circuitry 204 can also be used to gather information on the environment in which HMD 150A is operating. Output components in the input-output circuitry 204 can allow the HMD 150A to provide the user 140 with output and can be used to communicate with external electrical equipment.

Display(s) 206 of the input-output circuitry 204 can be used to display images (e.g., the full 360-degree video frame 300 shown in FIG. 3A) to the user 140 (shown in FIG. 1) of the HMD 150A. The display(s) 206 can be configured to have pixel array(s) to generate images that are presented to the user 140 through an optical system. The optical system can, if desired, have a transparent portion through which the user 140 (viewer) can observe real-world objects while computer-generated content is overlaid on top of the real-world objects by producing computer-generated images (e.g., the full 360-degree video frame 300) on the display(s) 206. In embodiments of the invention, the display(s) 206 are immersive views of the full 360-degree video frame 300, wherein the display(s) 206 place tiny screens and lenses close to the user's eyes to simulate large screens that encompass most of the user's field of view. As the user 140 performs actions like walking, head rotating (i.e., changing the point of view), data describing behavior of the user 140 (shown in FIG. 1) is fed to the host server 130 (shown in FIG. 1) from the HMD 150A and/or the manipulation devices 152 (shown in FIG. 1).

The optical components 208 can be used in forming the optical system that presents images to the user 140. The optical components 208 can include static components such as waveguides, static optical couplers, and fixed lenses. The optical components 208 can also include adjustable optical components such as an adjustable polarizer, tunable lenses (e.g., liquid crystal tunable lenses; tunable lenses based on electro-optic materials; tunable liquid lenses; microelectromechanical system tunable lenses; or other tunable lenses), a dynamically adjustable coupler, and other optical devices formed from electro-optical materials (e.g., lithium niobate or other materials exhibiting the electro-optic effect). The optical components 208 can be used in receiving and modifying light (images) from the display 206 and in providing images (e.g., the full 360-degree video frame 300) to the user 140 for viewing. In some embodiments of the invention, one or more of the optical components 208 can be stacked so that light passes through multiple of the components 208 in series. In embodiments of the invention, the optical components 208 can be spread out laterally (e.g., multiple displays can be arranged on a waveguide or set of waveguides using a tiled set of laterally adjacent couplers).

In some embodiments of the invention, both tiling and stacking configurations are present.

The input-output devices 210 of the input-output circuitry 204 are configured to gather data and user input and for supplying the user 140 (shown in FIG. 1) with output. The input-output devices 210 can include sensors 212, audio components 214, and other components for gathering input from the user 140 and/or or the environment surrounding the HMD 150A and for providing output to the user 140. The input-output devices 210 can, for example, include keyboards; buttons; joysticks; touch sensors for trackpads and other touch sensitive input devices; cameras; light-emitting diodes; and/or other input-output components. For example, cameras or other devices in the input-output circuitry 204 can face the eyes of the user 140 and track the gaze of the user 140. The sensors 212 can include position and motion sensors, which can include, for example, compasses; gyroscopes; accelerometers and/or other devices for monitoring the location, orientation, and movement of the HMD 150A; and satellite navigation system circuitry such as Global Positioning System (GPS) circuitry for monitoring location of the user 140. The sensors 212 can further include eye-tracking functionality. Using the sensors 212, for example, the control circuitry 202 can monitor the current direction in which a user's head is oriented relative to the surrounding environment. Movements of the user's head (e.g., motion to the left and/or right to track on-screen objects and/or to view additional real-world objects) can also be monitored using the sensors 212.

In some embodiments of the invention, the sensors 212 can include ambient light sensors that measure ambient light intensity and/or ambient light color; force sensors; temperature sensors; touch sensors; capacitive proximity sensors; light-based proximity sensors; other types of proximity sensors; strain gauges; gas sensors; pressure sensors; moisture sensors; magnetic sensors; and the like. The audio components 214 can include microphones for gathering voice commands and other audio input and speakers for providing audio output (e.g., ear buds, bone conduction speakers, or other speakers for providing sound to the left and right ears of a user). In some embodiments of the invention, the input-output devices 210 can include haptic output devices (e.g., vibrating components); light-emitting diodes and other light sources; and other output components. The input-output circuitry 204 can include wired and/or wireless communications circuitry 216 that allows the HMD 150A (e.g., using the control circuitry 202) to communicate with external equipment (e.g., remote controls, joysticks, input controllers, portable electronic devices, computers, displays, and the like) and that allows signals to be conveyed between components (circuitry) at different locations in the HMD 150A.

FIG. 3A depicts a full 360-degree video frame 300 generated by the host server 130. In embodiments of the invention, the host server 130 is configured and arranged to generate streaming video/image data and transmit the same over the networks 120A, 120B, along with local user behavior data and local user attribute data in input data stream 116 received from the user 140 (via display(s) 148) to generate the output data stream 118 and provide it to the display(s) 148. In embodiments of the invention, the displays 148 can be configured to support a function-API (application program interface) that allows a local user to input local user behavior data (e.g., adjust the displayed region 302 shown in FIG. 2B) to be input to the system 100 flexibly. In accordance with embodiments of the invention, the output data stream 118 includes the full 360-degree video frame 300 shown at a time denoted as TimeN. The full 360-degree video frame 300 is depicted in FIG. 3A as an equirectangular mapped 360-degree video frame where the yaw angle (−180 to +180 degrees) and the pitch angle (−90 to +90 degrees) are mapped to the x-axis and the y-axis, respectively. The full 360-degree video frame 300 can be a video recording where a view in every direction is recorded at the same time, shot using an omnidirectional camera or a collection of cameras. During playback on a normal flat display (e.g., the NHMD 160), the local user 140 has control of the viewing direction like a panorama. The full 360-degree video frame 300 can also be played on displays or projectors arranged in a sphere or some part of a sphere (not shown). The displayed region 302 (also known as the visible area or the user's viewpoint) of the full 360-degree video frame 300 can be displayed on the displays 148. In embodiments of the invention where the display 148 is incorporated within the HMD 150, immersive (i.e., 3D) views of the full 360-degree video frame 300 can be displayed to the local user 140 on a display (e.g., display 206 shown in FIG. 2) of the HMD 150, which places tiny screens and lenses close to the eyes of the local user 140 to simulate large screens. As the local user 140 performs actions like walking, head rotating (i.e., changing the point of view), data describing behavior of the local user 140 is fed through the input data stream 116 to the host server 130 from the HMD 150 and/or the manipulation devices 152. The host server 130 processes the information in real-time and generates appropriate feedback that is passed back to the user 140 by means of the output data stream 118.

Figure 3B:
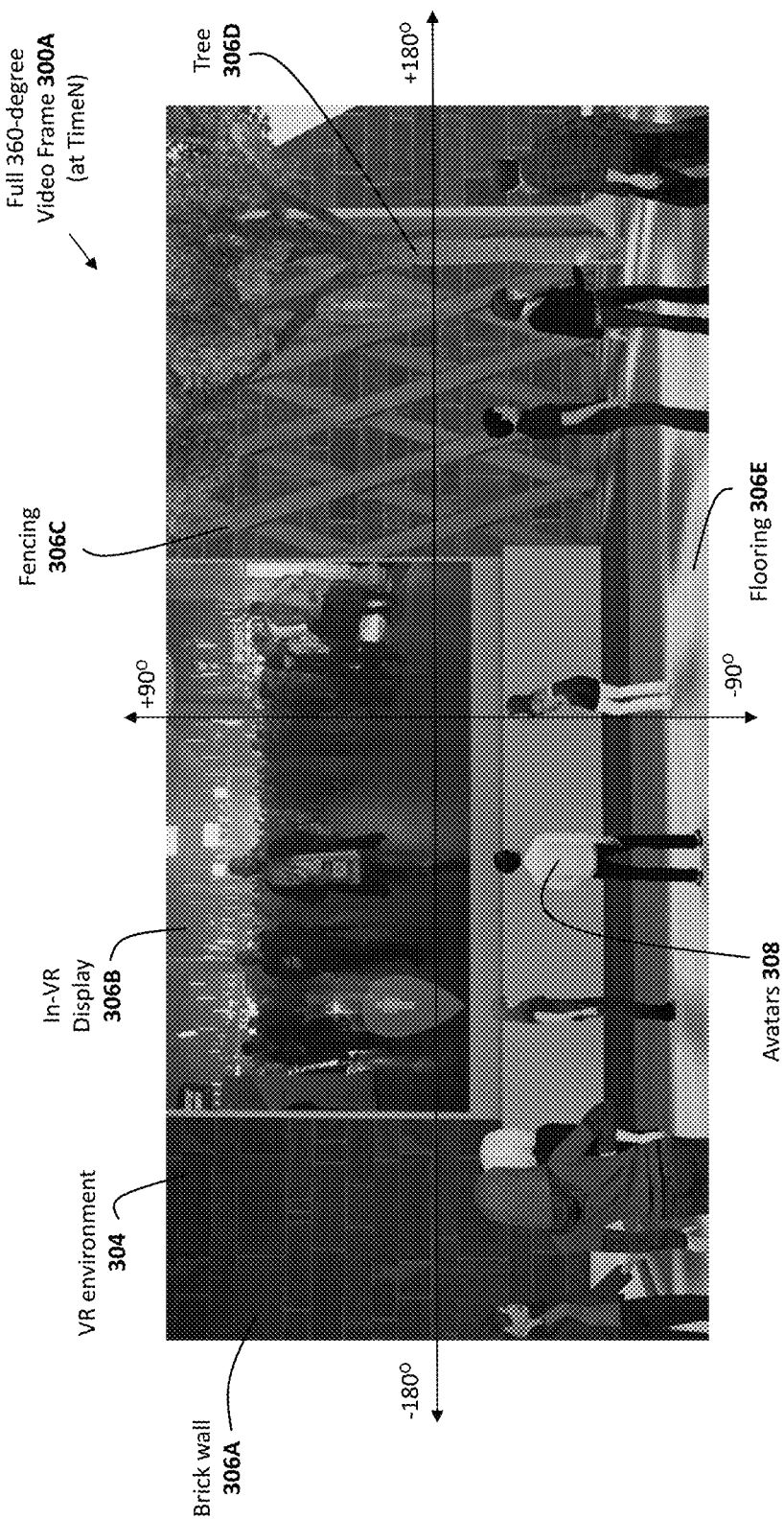
FIG. 3B depicts a block diagram illustrating additional details of a full 360-degree video frame according to embodiments of the invention.

FIG. 3B depicts a simplified example of a full 360-degree video frame 300A that can be generated when the system 100 (shown in FIG. 1) is used to virtually host a conference, meeting, or other collaboration-based event. In the example depicted in FIG. 3B, the frame 300A displays a VR environment 304 operable to include and convey a variety of multisensory components, including a brick wall 306A; an in-VR display 306B; fencing 306C; trees 306D; flooring 306E; a plurality of avatars 308 representing the conference/meeting attendees (e.g., local user 140 and remote users 110 shown in FIG. 1); and the many engagement modalities (e.g., sight, sound, movement, time, smell, sound, and the like) implemented by the host server 130 (shown in FIG. 1) in the course of generating the VR environment 304. In accordance with aspects of the invention, one or more of the avatars 308 can find the VR environment 304 and its associated multisensory engagement modalities overwhelming. Accordingly, and as described in greater detail herein, the system 100 can implement aspects of the invention to improve engagement and attentive collaboration for the one or more of the avatars 308 that find the VR environment 304 overwhelming by providing the one or more of the avatars 308 with dynamically-updated, decluttered views of the frame 300A in the VR environment 304.

FIG. 3C depicts another simplified example of a full 360-degree video frame 300B that can be generated when the system 100 (shown in FIG. 1) is used to virtually host a conference, meeting, or other collaboration-based event. In the example depicted in FIG. 3C, the frame 300B displays a VR environment 304A that further illustrates the cluttered nature of the VR environment 304A by showing an Avatar-1 that operates as the local-user (e.g., local-user 140 shown in FIG. 1), along with a relatively large number of other Avatars 310 that represent the conference/meeting attendees (e.g., remote users 110 shown in FIG. 1) and generate a relatively large volume of engagement modalities (e.g., sight, sound, movement, time, smell, sound, and the like). In accordance with aspects of the invention, the VR environment 304A further illustrates that Avatar-1 can find the VR environment 304A and its associated multisensory engagement modalities overwhelming. Accordingly, and as described in greater detail herein, the system 100 can implement aspects of the invention to improve engagement and attentive collaboration for Avatar-1 who finds the VR environment 304A overwhelming by providing Avatar-1 with dynamically-updated, decluttered views of the frame 300B in the VR environment 304A.

Figure 3D:
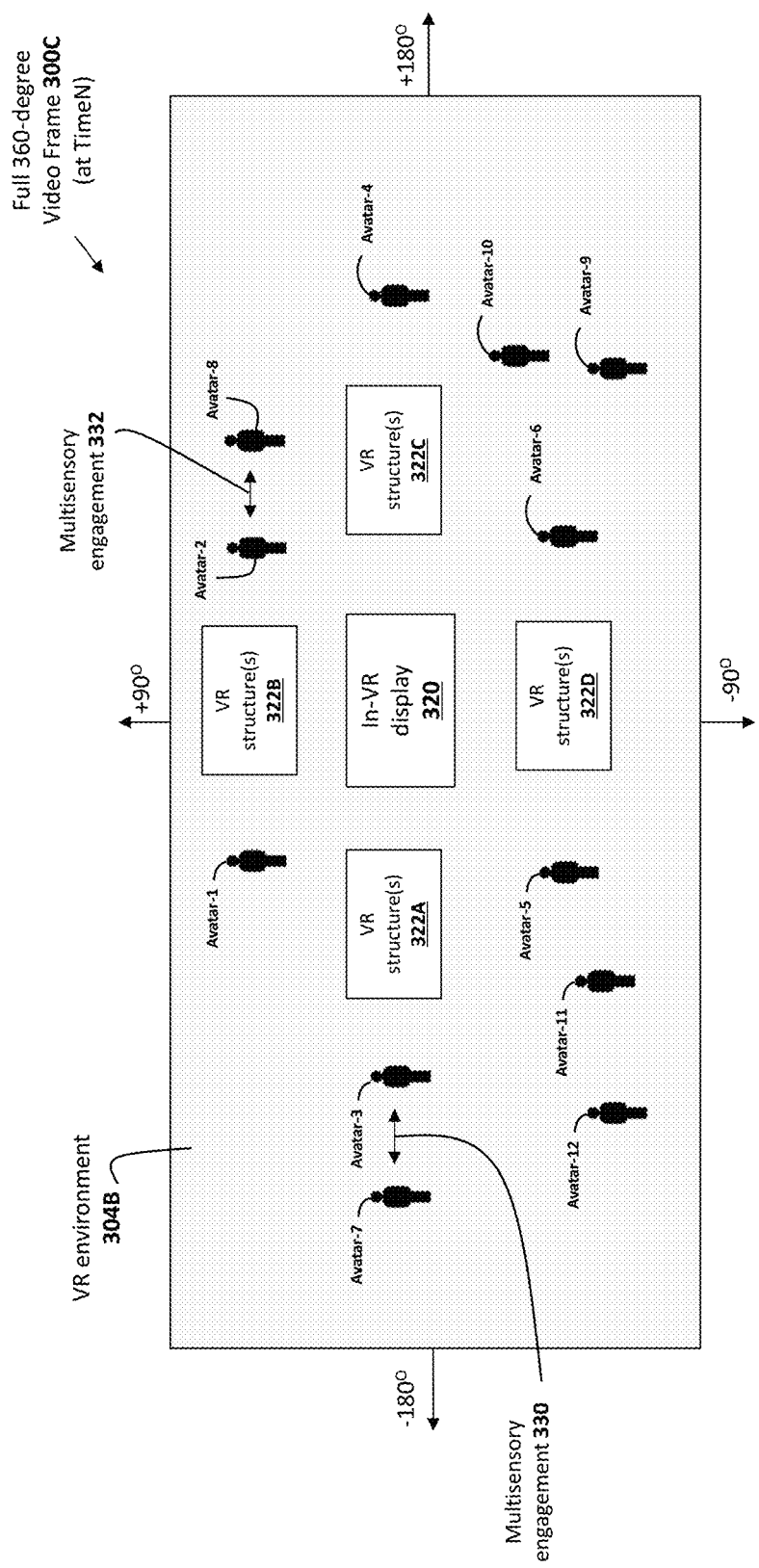
FIG. 3D depicts a block diagram illustrating additional details of a full 360-degree video frame according to embodiments of the invention.

FIG. 3D depicts another simplified example of a full 360-degree video frame 300C that can be generated when the system 100 (shown in FIG. 1) is used to virtually host a conference, meeting, or other collaboration-based event. In the example depicted in FIG. 3D, the frame 300C displays a VR environment 304B operable to include and convey a variety of multisensory components, including VR structures 322A, 322B, 322C, 322D; an in-VR display 320; a plurality of avatars (Avatar-1 through Avatar-12) representing the conference/meeting attendees (e.g., local user 140 and remote users 110 shown in FIG. 1); and multisensory engagements 330, 332, which are examples of the various multisensory engagement modalities (e.g., sight, sound, movement, time, smell, sound, and the like) that can occur between any combination of the avatars (Avatar-1 through Avatar-12) and the in-VR display 320. In accordance with aspects of the invention, one or more of the avatars (Avatar-1 through Avatar-12) can find the VR environment 304B and its associated multisensory engagement modalities overwhelming. Accordingly, and as described in greater detail herein, the system 100 can implement aspects of the invention to improve engagement and attentive collaboration for any one or more of the avatars (Avatar-1 through Avatar-12) that find the VR environment 304B overwhelming by providing the one or more of the avatars (Avatar-1 through Avatar-12) with dynamically-updated, decluttered views of the frame 300C in the VR environment 304B.

Figure 3E:
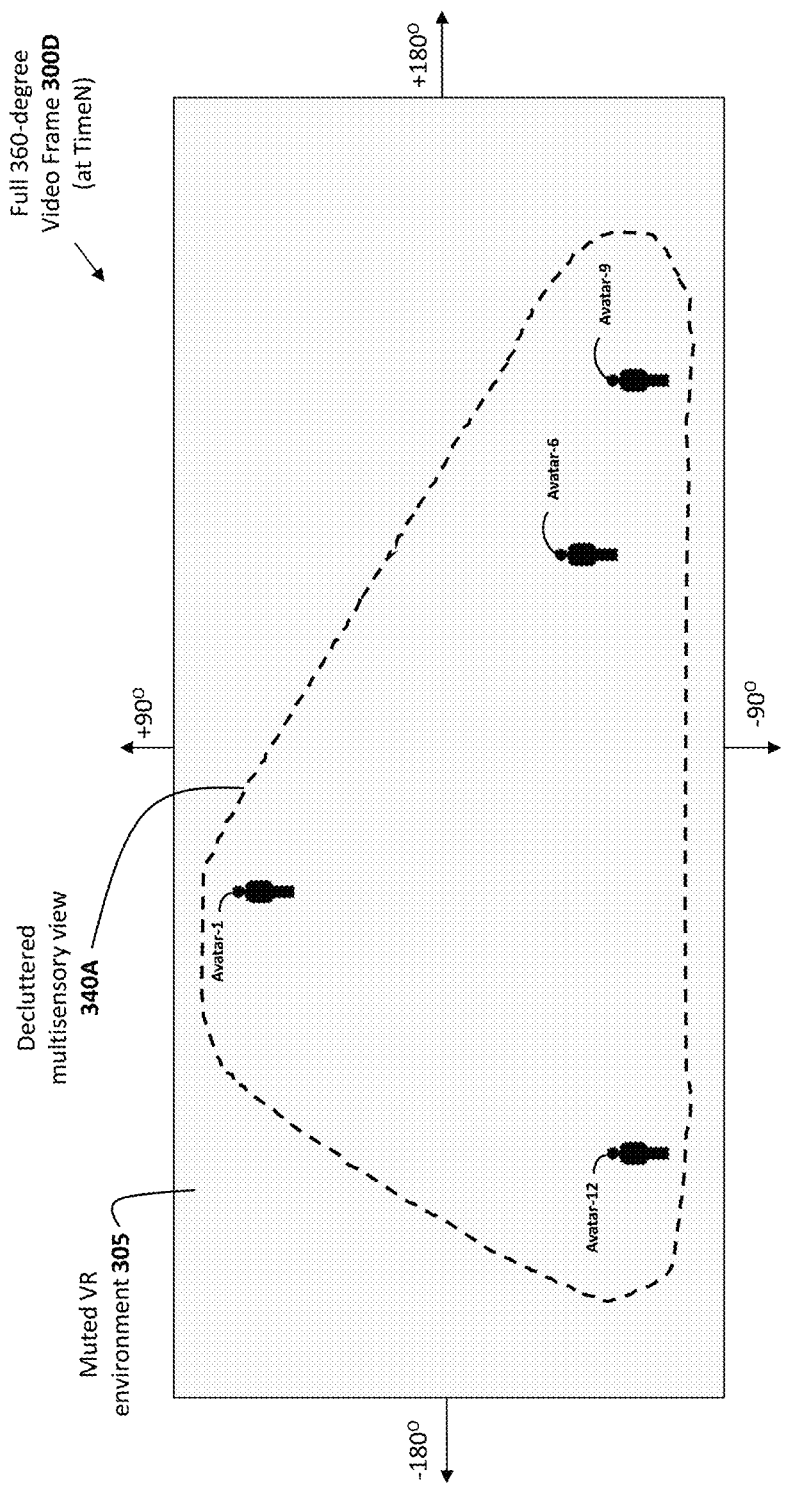
FIG. 3E depicts a block diagram illustrating additional details of a full 360-degree video frame having a multisensory decluttered view according to embodiments of the invention.
Figure 3F:
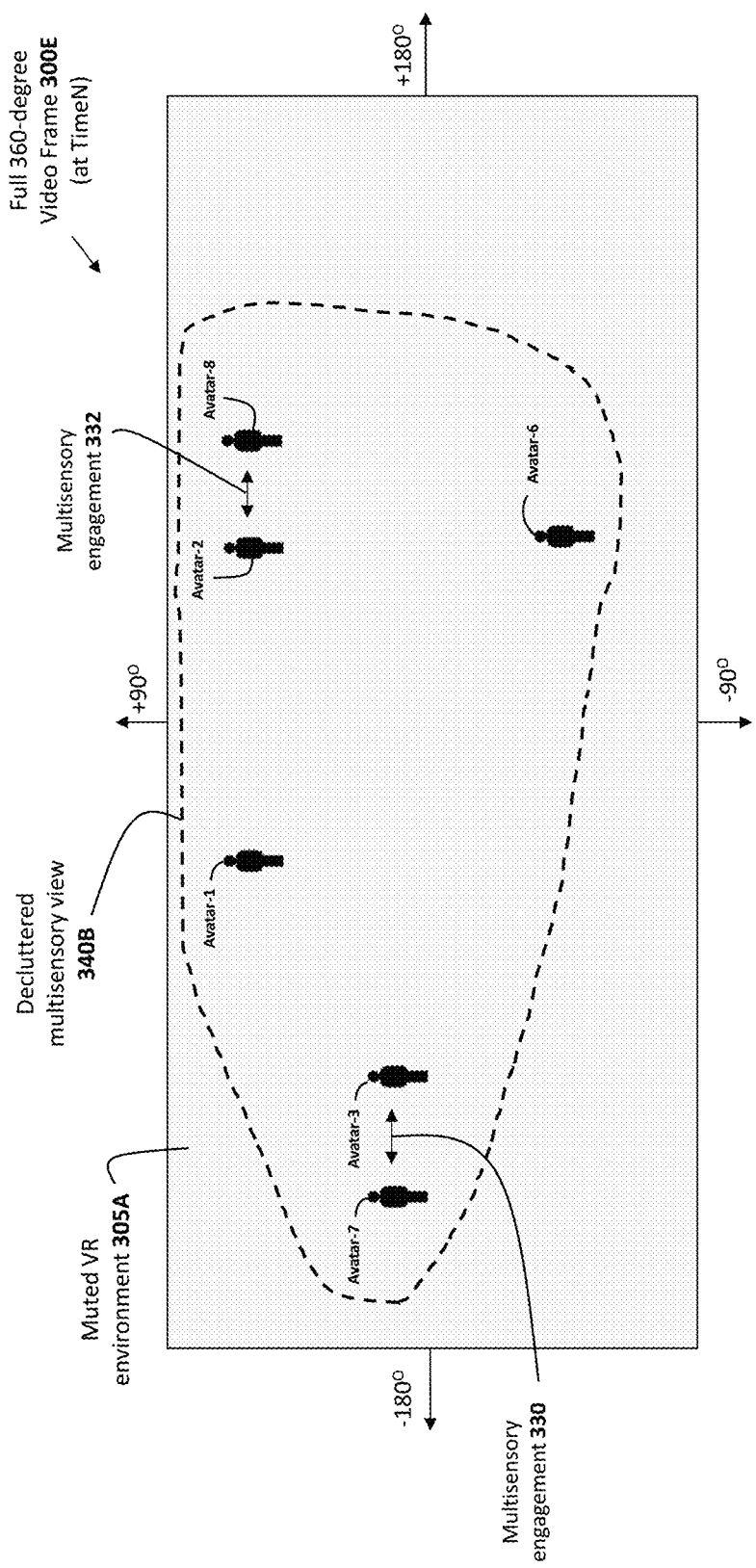
FIG. 3F depicts a block diagram illustrating additional details of a full 360-degree video frame having a multisensory decluttered view according to embodiments of the invention.
Figure 3G:
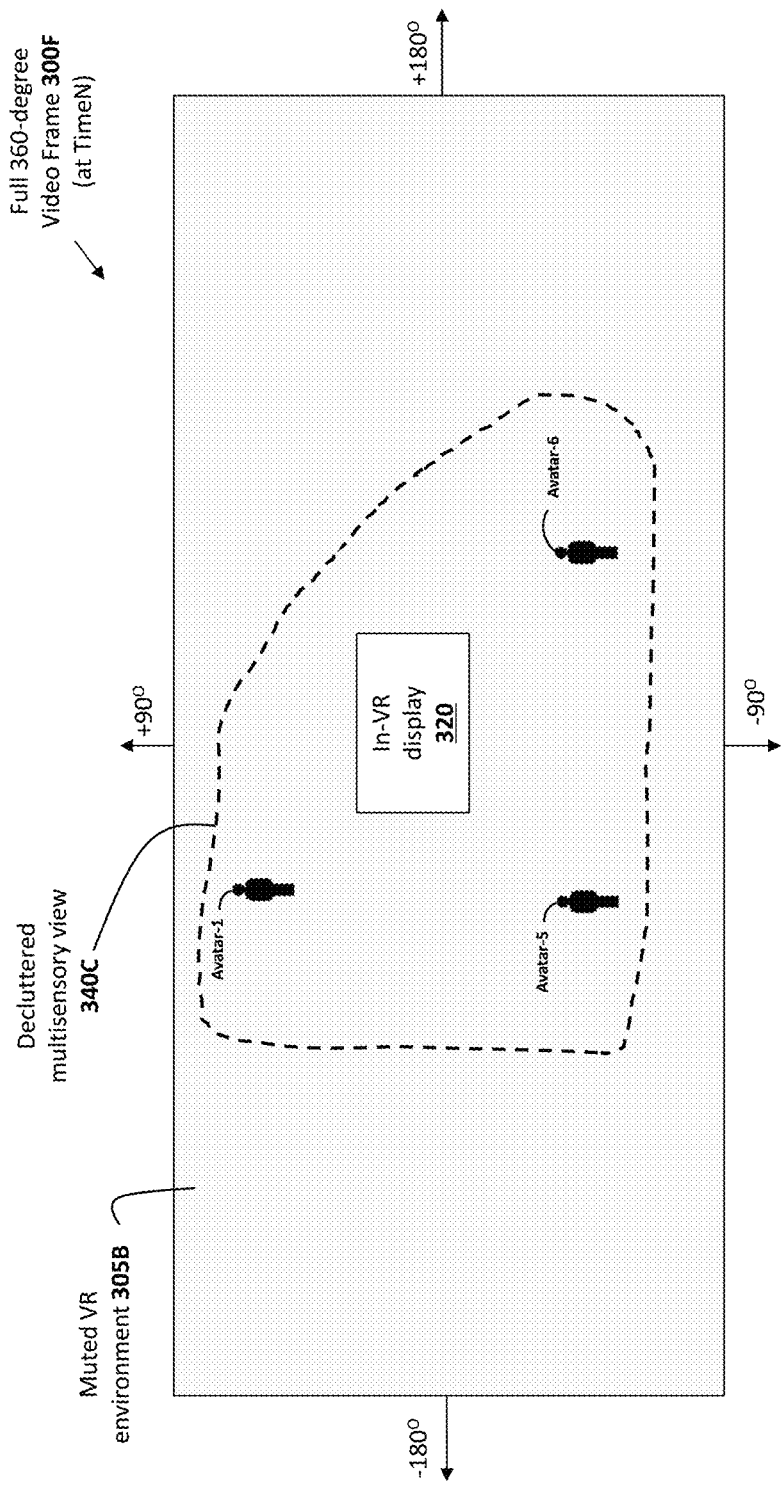
FIG. 3G depicts a block diagram illustrating additional details of a full 360-degree video frame having a multisensory decluttered view according to embodiments of the invention.

Aspects of the invention for generating FIGS. 3E, 3F, and 3G depict examples of multisensory decluttered frames 300D, 300E, 300F that result from applying aspects of the invention to the frame 300C shown in FIG. 3D. Before describing the multisensory decluttered frames 300D, 300E, 300F, aspects of the invention for generating the multisensory decluttered frames 300D, 300E, 300F will now be described with reference to FIGS. 4, 5, 6, and 7. Turning first to FIG. 4, an MSS model module 132A is depicted. The MSS model module 132A is an example of how the MSS model module 132 (shown in FIG. 1) can be implemented in accordance with aspects of the invention. In embodiments of the invention, the MSS model module 132A is operable to use MSS information 412 to generate a model of the VR environment 304B that is under analysis. In some embodiments of the invention, the model of the VR environment 304B is represented as a graph model configured to represent through its nodes and edges the full configuration of the VR environment 304B, including components, connections, characteristics, and multisensory functionality of the VR environment 304B.

Referring still to FIG. 4, the MSS information 412 can be represented as a graph-under-analysis (GUA) 410 using the graph database 418 having a graph search & analysis module 420 operable to perform various graph search and analysis operations in accordance with aspects of the invention. In general, graphs are mathematical structures used to model pair-wise relations between objects, which are generally represented by an "adjacency matrix," an example of which is shown as the GUA 410. The GUA 410 in this context is made up of nodes (N) (also called vertices or points) that are connected by edges (E) (also called links or lines). The adjacency matrix includes a square matrix whose elements indicate whether pairs of vertices are connected or not in the graph. A distinction is made between undirected graphs in which edges link two vertices symmetrically and directed graphs in which edges link two vertices asymmetrically. Graphs can be used to model many types of relations and processes in physical, biological, social, and information systems. The term network can be defined as a graph in which attributes (e.g., features, attributes, components, connections, and the like) are associated with the vertices and edges.

Graphs are a meaningful and understandable representation of the MSS information 412 organized as a sequence of frames (e.g., frame 300C) conveying a VR environment (e.g., VR environment 304B), and the edge/node relationships in graphs can be analyzed using a specific subset of mathematics, statistics, and machine learning techniques. In some embodiments of the invention, in order to expand the machine learning tools that can be used to analyze the GUA 410, the GUA 410 can be translated to a vector space known as embeddings or graph embeddings. Graph embeddings are the transformation of various graph properties to a vector or a set of vectors. In general, computer-based analysis operations performed on vectors is simpler and faster than comparable analysis operations performed directly on graphs. The vector space captured or encoded in a graph embedding should include the graph topology, vertex-to-vertex relationship, and other relevant information about the graph, its sub-graphs, and its vertices.

The MSS information 412 can be gathered and ingested into a graph model using the graph database 418. In embodiments of the invention, the graph database 418 can be implemented as a software implementation of a model of the graph (e.g., GUA 410), consisting of nodes (N), edges (E) and properties of the nodes and edges. The graph database 418 includes graph search and analysis 420 functionality operable to implement a number of efficient operations to create the graph structure model, query for various conditions in the graph, and/or transform sub-sections of the graph. The GUA 410 models the VR environment 304B (shown in FIG. 3D) as a graph of nodes (N) representing the variety of multisensory components, including VR structures 322A, 322B, 322C, 322D; an in-VR display 320; a plurality of avatars (Avatar-1 through Avatar-12) representing the conference/meeting attendees (e.g., local user 140 and remote users 110 shown in FIG. 1); and multisensory engagements 330, 332, which are examples of the various multisensory engagement modalities (e.g., sight, sound, movement, time, smell, sound, and the like) that can occur between any combination of the avatars (Avatar-1 through Avatar-12) and the in-VR display 320. When the VR environment 304B is ingested into the graph database 418, operations performed by the host server 130 (shown in FIG. 1) (e.g., the methodology 700 shown in FIG. 7) can be facilitated by use of the various graph database available operators, which are represented by the graph search and analysis 420. The graph database 418 enables scaling of the various embodiments of the invention, including specifically the host server 130 to large real-world sized VR environments having a large number of remote users 110 (show in FIG. 1).

FIG. 5 depicts a multisensory declutter analysis module 134A. The multisensory declutter analysis module 134A is an example of how the multisensory declutter analysis module 134 (shown in FIG. 1) can be implemented in accordance with aspects of the invention. In embodiments of the invention, the multisensory declutter analysis module 134A includes a graph database 418A, which is a more detailed implementation of the graph database 418 (shown in FIG. 4). In embodiments of the invention, the graph database 418A includes the graph search & analysis module 420, along with a cognitive computing system 530. In some embodiments of the invention, the operations performed by the graph database 418A can be enhanced using the cognitive computing system 530. In some embodiments of the invention, the cognitive computing system (cognitive computer) 530 can be implemented as a computer-based Q&A module operable to generate an answer to natural language questions in support of interrogation operations performed by the graph database. As a non-limiting example, the Q&A module can include all of the features and functionality of IBM® Watson® DeepQA. DeepQA is a Q&A system that can conduct an interrogation on any subject by applying elements of natural language processing, machine learning, information retrieval, hypothesis generation, hypothesis scoring, final ranking, and answer merging to arrive at a conclusion. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM.

In embodiments of the invention, the multisensory declutter analysis module 134A is operable to use the graph model (e.g., the GUA 410 shown in FIG. 4), local-user preference (LUP) information 510, and local-user state (LUS) information 512 to generate the multisensory decluttered streams 514, which are used by the host server 130 (shown in FIG. 1) to generate the multisensory decluttered frames 300D, 300E, 300F (shown in FIGS. 3E, 3F, 3G), along with the muted VR environments 305, 305A, 305B (shown in FIGS. 3E, 3F, 3G). In embodiments of the invention, the LUP information 510 can include a variety of personal preferences and interests for the local-user (e.g., local-user 140 shown in FIG. 1) in relation to the MSS information 412. In embodiments of the invention, the LUS information 512 can include time, movement, subject change, interest drift (video focus versus verbal), profile preferences, direct level-of-interest, inferred level-of-interest, and the like. In some embodiments of the invention, the LUP information 510 and/or the LUS information 512 can include an identification (e.g., by the local-user 140) of the levels of attention the local-user 140 needs from others collaborators/attendees. In some embodiments of the invention, the interests and viewpoints of other collaborators/attendees (e.g., remote users 110 shown in FIG. 1) can be used to enhance the multisensory declutter analysis 134A. For example, if the system 100 (shown in FIG. 1) detects that the local-user 140 and one of the remote users 110 are independently discussing the same topic, the multisensory declutter analysis 134A can be configured to perform its filtering/analysis operations in a manner that includes these independent discussions in the multisensory decluttered streams 514 for the local-user 140, as well as in multisensory decluttered streams generated by a corresponding graph database for one of the remote users 110.

Figure 7:
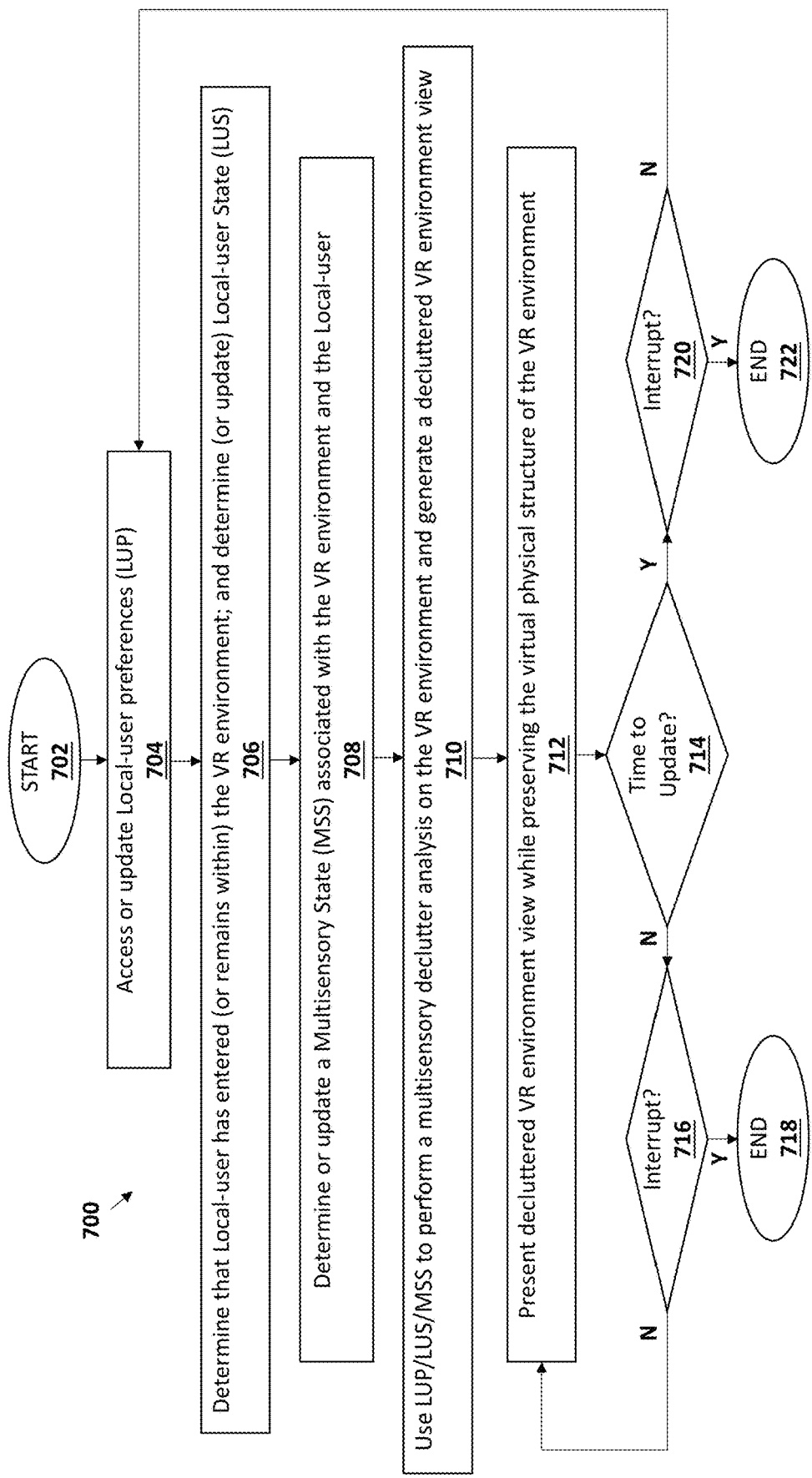
FIG. 7 depicts a flow diagram illustrating an example computer-implemented methodology according to embodiments of the invention.

The operations performed by the multisensory declutter analysis module 134A will now be described in greater detail with reference to the computer-implemented methodology 700 shown in FIG. 7 and the corresponding components of the system 100 show in FIGS. 1, 4, and 5. The methodology 700 begins at block 702 and subsequently moves to block 704 where the host server 130 accesses or updates the LUP information 510 (shown in FIG. 5). At block 706, the methodology 700 determines that the local-user 140 has entered the VR environment 304B, and the methodology 700 further determines or updates the LUS information 512. At block 708, the methodology 700 determines or updates an MSS state associated with the VR environment 304B and the local-user 140. In embodiments of the invention, the MSS state associated with the VR environment 304B can be captures as a graph model of the VR environment 304B using the features and functionality of the graph database 418A (shown in FIG. 5). In some embodiments of the invention, the graph model of the MSS state associated with the VR environment 304B can be captured in a graph database table.

A non-limiting example of a suitable format for the graph database table generated at block 708 of the methodology 700 is the graph database table 602 shown in FIG. 6. The table 602 identifies organizes individual input streams of the graph model of the VR environment 304B by providing columns labeled "Input," "Audio Stream," "Orientation," and "Multisensory component Details." The "Input" column identifies the multisensory stream using, for example, a number. The "Audio Stream" column identifies the details of the audio components of the multisensory stream. The "Orientation" column identifies details of the general location of the multisensory stream; and the "Multisensory Component Details" column provides additional descriptive and location details of the given multisensory component.

The methodology 700 moves to block 710 and uses the LUP information 510, the LUS information 512, and the graph model of the MSS of the VR environment 304B to perform a multisensory declutter analysis on the graph model of the VR environment 304B to generate the multisensory decluttered streams 514, which are used by the host server 130 to generate a decluttered multisensory VR environment view in the form of the muted VR environment views 305, 305A, 305B (shown in FIGS. 3E, 3F, 3G) combined with the decluttered multisensory views 340A, 340B, 340C (shown in FIGS. 3E, 3F, 3G), respectively. In some embodiments of the invention, the multisensory declutter analysis of block 710 is applied by filtering or otherwise analyzing the multisensory state (e.g., the graph database table 602 shown in FIG. 6) associated with the VR environment 304B and the local-user 140 based at least in part on the LUP information 510 and/or the LUS information 512. In some embodiments of the invention, the filtering and/or analysis of the multisensory state associated with the VR environment 304 and the local-user 140 is performed or generated using the graph database 418A (shown in FIG. 5) to search, compare, and otherwise analyze the graph database table 602 of the VR environment 304A occupied by the local-user 140.

The methodology 700 moves to block 712 and presents the decluttered multisensory VR environment view in the form of the muted VR environment views 305, 305A, 305B (shown in FIGS. 3E, 3F, 3G) combined with the decluttered multisensory views 340A, 340B, 340C (shown in FIGS. 3E, 3F, 3G), respectively, while (optionally) preserving the VR physical structure of the VR environment 304B. For example, if the local-user 140 begins to virtually walk or move to a new location in the VR environment 304B while the decluttered multisensory VR environment view is being displayed to the local-user 140, a table (e.g., VR structure 322C shown in FIG. 3D) that is not included in the decluttered multisensory VR environment view but is in the path of the local-user 140 when the local-user 140 begins to walk will still be in the path of the local-user 140 when the local-user 140 begins to walk. In some embodiments of the invention, the system 100 (e.g., through the multisensory declutter analysis performed at block 710) can be configured to bring the table (and other VR structure items) into the decluttered multisensory VR environment view if the local-user 140 begins to walk through or otherwise navigate the VR environment 304B.

The methodology 700 moves to decision block 714 to determine whether or not it time to automatically and dynamically update or refresh the operations at blocks 704, 706, 708, 710, 712. If the answer to the inquiry at decision block 714 is no, the methodology 700 moves to block decision block 716 to determine whether an interrupt instruction has been received by the system 100 (e.g., from a remote server operating through the cloud computing system 50 show in FIG. 1). If the answer to the inquiry at decision block 716 is yes, the methodology 700 moves to block 718 and ends. If the answer to the inquiry at decision block 716 is no, the methodology 700 moves to block 712 and continues to present the decluttered multisensory VR environment view in the form of the muted VR environment views 305, 305A, 305B (shown in FIGS. 3E, 3F, 3G) combined with the decluttered multisensory views 340A, 340B, 340C (shown in FIGS. 3E, 3F, 3G), respectively, while (optionally) preserving the VR physical structure of the VR environment 304B.

Returning to decision block 714, if the answer to the inquiry at decision block 714 is yes, the methodology 700 moves to block decision block 720 to determine whether an interrupt instruction has been received by the system 100 (e.g., from a remote server operating through the cloud computing system 50 show in FIG. 1). If the answer to the inquiry at decision block 720 is yes, the methodology 700 moves to block 722 and ends. If the answer to the inquiry at decision block 720 is no, the methodology 700 moves to block 722 to automatically and dynamically update or refresh the operations at blocks 704, 706, 708, 710, 712.

FIGS. 3E, 3F, 3G depict example results of performing the methodology 700 on the VR environment 304B (shown in FIG. 3D) to generate various instance of decluttered multisensory VR environment views in the form of the muted VR environment views 305, 305A, 305B (shown in FIGS. 3E, 3F, 3G) combined with the decluttered multisensory views 340A, 340B, 340C (shown in FIGS. 3E, 3F, 3G), respectively, while (optionally) preserving the VR physical structure of the VR environment 304B. As shown in FIG. 3E, the methodology 700 automatically and dynamically selects Avatar-1 (which corresponds to the local-user 140), Avatar-6, Avatar-9, Avatar-12 and their associated multisensory component information (e.g., multisensory component details as shown in table 602 of FIG. 6) for inclusion in the decluttered multisensory view 340A. As shown in FIG. 3F, the methodology 700 automatically and dynamically selects Avatar-1, Avatar-2, Avatar-3, Avatar-6, Avatar-8, Avatar-8, Avatar-12 and their associated multisensory component information (e.g., multisensory engagements 330, 332; and multisensory component details as shown in table 602 of FIG. 6) for inclusion in the decluttered multisensory view 340B. As shown in FIG. 3G, the methodology 700 automatically and dynamically selects Avatar-1, Avatar-5, Avatar-6, In-VR display 320, and their associated multisensory component information (e.g., multisensory information generated by the In-VR display 320; and multisensory component details as shown in table 602 of FIG. 6) for inclusion in the decluttered multisensory view 340C.

An example of machine learning techniques that can be used to implement aspects of the invention (e.g., the cognitive computer 530 shown in FIG. 5) will be described with reference to FIGS. 8 and 9. Machine learning models configured and arranged according to embodiments of the invention will be described with reference to FIG. 8.

Figure 8:
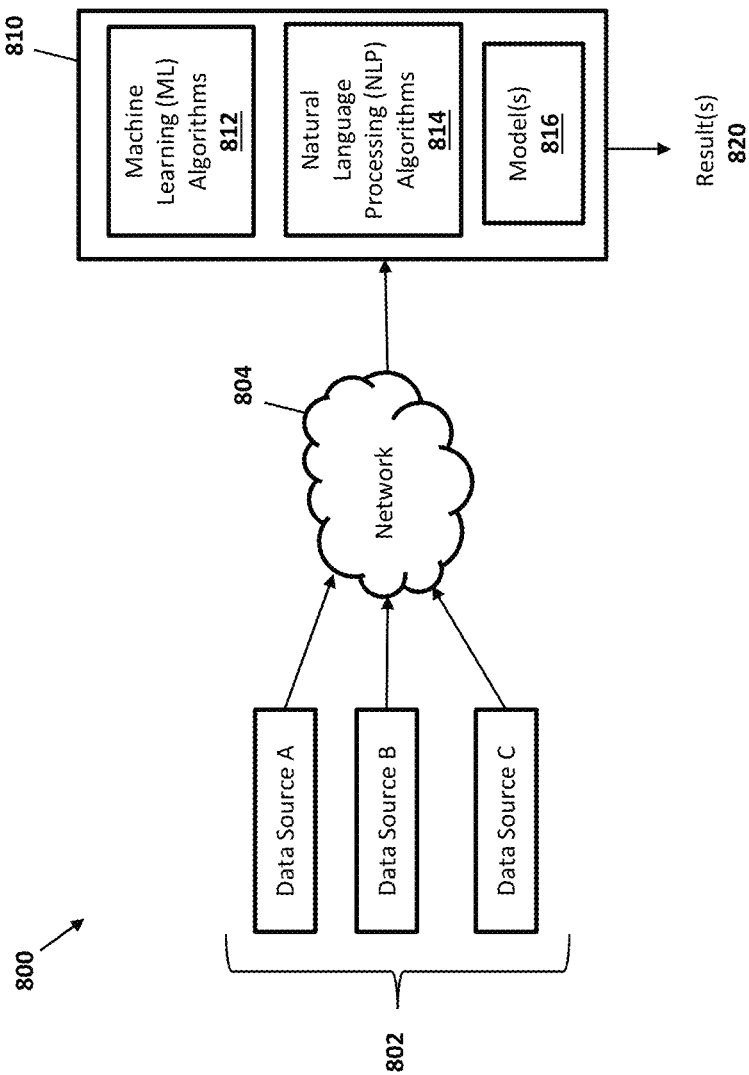
FIG. 8 depicts a machine learning system that can be utilized to implement aspects of the invention.

FIG. 8 depicts a block diagram showing a machine learning or classifier system 800 capable of implementing various aspects of the invention described herein. More specifically, the functionality of the system 800 is used in embodiments of the invention to generate various models and sub-models that can be used to implement computer functionality in embodiments of the invention. The system 800 includes multiple data sources 802 in communication through a network 804 with a classifier 810. In some aspects of the invention, the data sources 802 can bypass the network 804 and feed directly into the classifier 810. The data sources 802 provide data/information inputs that will be evaluated by the classifier 810 in accordance with embodiments of the invention. The data sources 802 also provide data/information inputs that can be used by the classifier 810 to train and/or update model(s) 816 created by the classifier 810. The data sources 802 can be implemented as a wide variety of data sources, including but not limited to, sensors configured to gather real time data, data repositories (including training data repositories), and outputs from other classifiers. The network 804 can be any type of communications network, including but not limited to local networks, wide area networks, private networks, the Internet, and the like.

The classifier 810 can be implemented as algorithms executed by a programmable computer such as a computing environment 1000 (shown in FIG. 11). As shown in FIG. 8, the classifier 810 includes a suite of machine learning (ML) algorithms 812; natural language processing (NLP) algorithms 814; and model(s) 816 that are relationship (or prediction) algorithms generated (or learned) by the ML algorithms 812. The algorithms 812, 814, 816 of the classifier 810 are depicted separately for ease of illustration and explanation. In embodiments of the invention, the functions performed by the various algorithms 812, 814, 816 of the classifier 810 can be distributed differently than shown. For example, where the classifier 810 is configured to perform an overall task having sub-tasks, the suite of ML algorithms 812 can be segmented such that a portion of the ML algorithms 812 executes each sub-task and a portion of the ML algorithms 812 executes the overall task. Additionally, in some embodiments of the invention, the NLP algorithms 814 can be integrated within the ML algorithms 812.

The NLP algorithms 814 include speech recognition functionality that allows the classifier 810, and more specifically the ML algorithms 812, to receive natural language data (text and audio) and apply elements of language processing, information retrieval, and machine learning to derive meaning from the natural language inputs and potentially take action based on the derived meaning. The NLP algorithms 814 used in accordance with aspects of the invention can also include speech synthesis functionality that allows the classifier 810 to translate the result(s) 820 into natural language (text and audio) to communicate aspects of the result(s) 820 as natural language communications.

The NLP and ML algorithms 814, 812 receive and evaluate input data (i.e., training data and data-under-analysis) from the data sources 802. The ML algorithms 812 include functionality that is necessary to interpret and utilize the input data's format. For example, where the data sources 802 include image data, the ML algorithms 812 can include visual recognition software configured to interpret image data. The ML algorithms 812 apply machine learning techniques to received training data (e.g., data received from one or more of the data sources 802) in order to, over time, create/train/update one or more models 816 that model the overall task and the sub-tasks that the classifier 810 is designed to complete.

Figure 9:
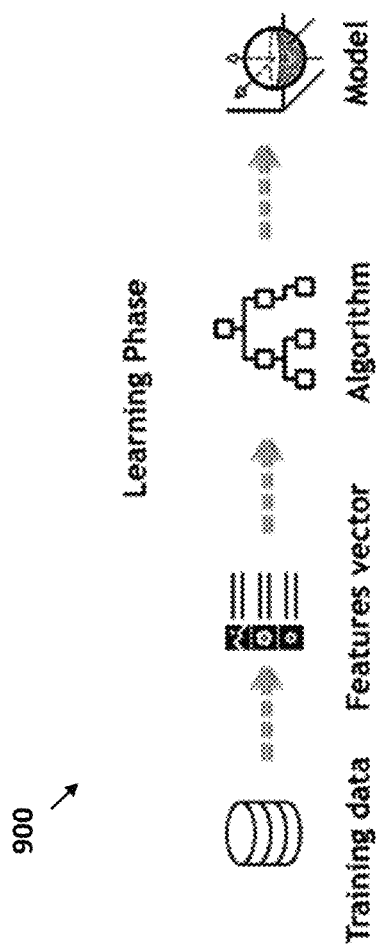
FIG. 9 depicts a learning phase that can be implemented by the machine learning system shown in FIG. 8.

Referring now to FIGS. 8 and 9 collectively, FIG. 9 depicts an example of a learning phase 900 performed by the ML algorithms 812 to generate the above-described models 816. In the learning phase 900, the classifier 810 extracts features from the training data and coverts the features to vector representations that can be recognized and analyzed by the ML algorithms 812. The features vectors are analyzed by the ML algorithm 812 to "classify" the training data against the target model (or the model's task) and uncover relationships between and among the classified training data. Examples of suitable implementations of the ML algorithms 812 include but are not limited to neural networks, support vector machines (SVMs), logistic regression, decision trees, hidden Markov Models (HMMs), etc. The learning or training performed by the ML algorithms 812 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 810 and the ML algorithms 812. Unsupervised learning can utilize additional learning/training methods including, for example, clustering, anomaly detection, neural networks, deep learning, and the like.

When the models 816 are sufficiently trained by the ML algorithms 812, the data sources 802 that generate "real world" data are accessed, and the "real world" data is applied to the models 816 to generate usable versions of the results 820. In some embodiments of the invention, the results 820 can be fed back to the classifier 810 and used by the ML algorithms 812 as additional training data for updating and/or refining the models 816.

In aspects of the invention, the ML algorithms 812 and the models 816 can be configured to apply confidence levels (CLs) to various ones of their results/determinations (including the results 820) in order to improve the overall accuracy of the particular result/determination. When the ML algorithms 812 and/or the models 816 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 810 can be configured to apply confidence levels (CLs) to the results 820. When the classifier 810 determines that a CL in the results 820 is below a predetermined threshold (TH) (i.e., CL<TH), the results 820 can be classified as sufficiently low to justify a classification of "no confidence" in the results 820. If CL>TH, the results 820 can be classified as sufficiently high to justify a determination that the results 820 are valid. Many different predetermined TH levels can be provided such that the results 820 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
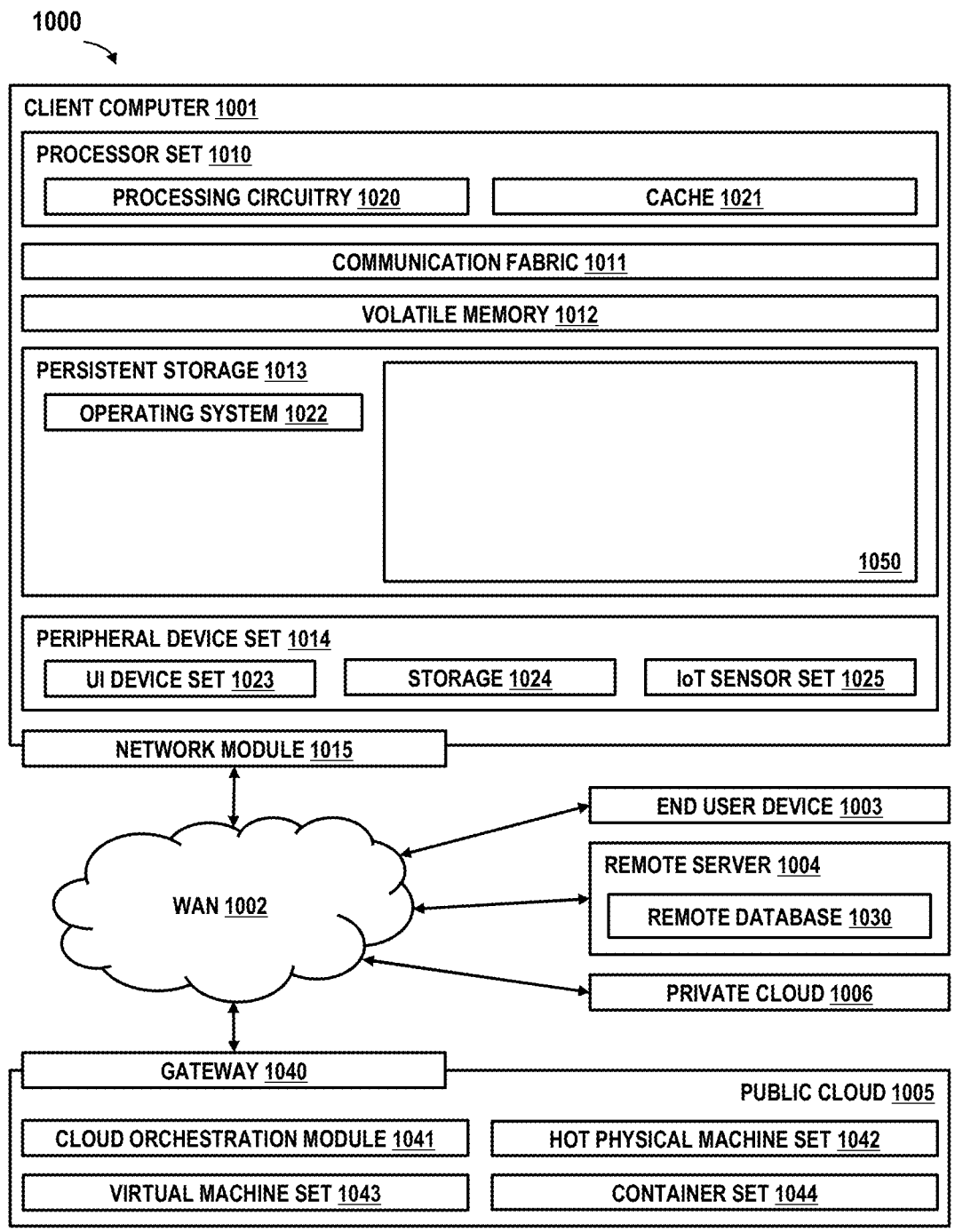
FIG. 10 depicts details of an exemplary computing environment operable to implement various aspects of the invention.

FIG. 10 depicts an example computing environment 1000 that can be used to implement aspects of the invention. Computing environment 1000 contains an example of an environment for the execution of at least some of the computer code involved in performing the inventive methods, such as the improved user experience in a VR environment using a novel multisensory declutter analysis 1050. In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," "electronically coupled to" and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer system comprising a processor electronically coupled to a memory, wherein the processor performs processor operations comprising:
   determining that a user is in a virtual reality (VR) environment;
   accessing a multisensory state associated with the VR environment and the user;
   wherein the multisensory state is based at least in part on multisensory engagement modalities that occur between other users in the VR environment;
   applying a multisensory declutter analysis to the multisensory state to generate decluttered multisensory streams; and
   using the decluttered multisensory streams to generate a decluttered multisensory view associated with the user.

2. The computer system of claim 1, wherein:
   the multisensory state comprises a graph model of the VR environment; and
   the multisensory declutter analysis comprises evaluating topics of discussions that occur between the other users in the VR environment.

3. The computer system of claim 1, wherein the multisensory declutter analysis comprises using user preference information and user state information to filter the multisensory state to generate the decluttered multisensory streams.

4. The computer system of claim 3, wherein:
   the multisensory state comprises a graph model of the VR environment; and
   a graph database is used to apply the multisensory declutter analysis to the graph model.

5. The computer system of claim 1, wherein the processor operations further comprise displaying the decluttered multisensory view in an immersive video frame of a display of the VR environment.

6. The computer system of claim 5, wherein portions of the immersive video frame of the VR environment that are not included in the decluttered multisensory view are deemphasized in the immersive video frame.

7. The computer system of claim 6, wherein the decluttered multisensory view is displayed to the user without interfering with one or more underlying virtual structures of the VR environment.

8. A computer-implemented method comprising:
   determining, using a processor system, that a user is in a virtual reality (VR) environment;
   accessing, using the processor system, a multisensory state associated with the VR environment and the user;
   wherein the multisensory state is based at least in part on multisensory engagement modalities that occur between other users in the VR environment;
   applying, using the processor system, a multisensory declutter analysis to the multisensory state to generate decluttered multisensory streams; and
   using the decluttered multisensory streams to generate a decluttered multisensory view associated with the user.

9. The computer-implemented method of claim 8, wherein;
   the multisensory state comprises a graph model of the VR environment; and
   the multisensory declutter analysis comprises evaluating topics of discussions between the other users in the VR environment.

10. The computer-implemented method of claim 8, wherein the multisensory declutter analysis comprises using user preference information and user state information to filter the multisensory state to generate the decluttered multisensory streams.

11. The computer-implemented method of claim 10, wherein:
    the multisensory state comprises a graph model of the VR environment; and
    a graph database of the processor system is used to apply the multisensory declutter analysis to the graph model.

12. The computer-implemented method of claim 8 further comprising displaying the decluttered multisensory view in an immersive video frame of a display of the VR environment.

13. The computer-implemented method of claim 12, wherein portions of the immersive video frame of the VR environment that are not included in the decluttered multisensory view are deemphasized in the immersive video frame.

14. The computer-implemented method of claim 13, wherein the decluttered multisensory view is displayed to the user without interfering with one or more underlying virtual structures of the VR environment.

15. A computer program product comprising a computer readable program stored on a computer readable storage medium, wherein the computer readable program, when executed on a processor system, causes the processor system to perform processor system operations comprising:
- determining that a user is in a virtual reality (VR) environment;
- accessing a multisensory state associated with the VR environment and the user;
- wherein the multisensory state is based at least in part on multisensory engagement modalities that occur between other users in the VR environment;
- applying a multisensory declutter analysis to the multisensory state to generate decluttered multisensory streams; and
- using the decluttered multisensory streams to generate a decluttered multisensory view associated with the user.

16. The computer program product of claim 15, wherein;
- the multisensory state comprises a graph model of the VR environment; and
- the multisensory declutter analysis comprises evaluating topics of discussions between the other users in the VR environment.

17. The computer program product of claim 15, wherein the multisensory declutter analysis comprises using user preference information and user state information to filter the multisensory state to generate the decluttered multisensory streams.

18. The program product of claim 17, wherein:
- the multisensory state comprises a graph model of the VR environment; and
- a graph database is used to apply the multisensory declutter analysis to the graph model.

19. The computer program product of claim 15, wherein the processor operations further comprise displaying the decluttered multisensory view in an immersive video frame of a display of the VR environment.

20. The computer program product of claim 19, wherein:
- portions of the immersive video frame of the VR environment that are not included in the decluttered multisensory view are deemphasized in the immersive video frame; and
- the decluttered multisensory view is displayed to the user without interfering with one or more underlying virtual structures of the VR environment.

* * * * *